United States Patent Office 3,524,804
Patented Aug. 18, 1970

3,524,804
DEVICE FOR LIMITING THE SHORT-CIRCUIT ENERGY IN ELECTROLYTIC METAL-SHAPING APPARATUS
Friedrich Götz, Bubenreuth, and Günter Jacoby, Erlangen, Germany, assignors to Siemens Aktiengesellschaft, a corporation of Germany
Filed Apr. 25, 1967, Ser. No. 633,491
Claims priority, application Germany, Apr. 26, 1966, S 103,417
Int. Cl. B23p 1/02; B01k 3/00
U.S. Cl. 204—224                          6 Claims

ABSTRACT OF THE DISCLOSURE

A device for limiting the short-circuit current between tool and workpiece of an electrolytic shaping or forming metal-forming machine whose tool and workpiece are connected to an alternating-current supply through an alternating-current controller and a rectifier in series with a smoothing reactor. A voltage sensing member is connected across the electrolyte gap between tool and workpiece and responds to a slight departure from the rated operating voltage to then cause the alternating-current controller to block the further supply of current. The member simultaneously releases a normally open power-current switch likewise connected across the electrotyte gap and constituted by thyristors or the like solid-state switches which are mounted by clamping them directly between the parallel and juxtaposed bus bars that supply the rectified current to the electrolytic metal-forming machine.

---

Our invention relates to devices for limiting the short circuit energy at the tool and the workpiece in electrolytic machines in which the workpiece, operating as the anode, and the tool, forming the cathode, are energized from an alternating-current line through a multi-phase current controller and through a rectifier arrangement, a smoothing reactor being series connected in the workpiece tool circuit.

According to the copending application of N. Bardahl and F. Goetz, Ser. No. 609,889, filed Jan. 17, 1967, and assigned to the assignee of the present invention excessive short-circuit currents and resulting damage to the expensive tool and other components of the equipment can be reduced by connecting a voltage sensing member across the electrolyte gap between tool and workpiece for response to a slight departure of the gap voltage from the rated operating voltage. When responding, the sensing member acts upon the alternating-current controller to block the further supply of alternating current and simultaneously closes a normally open power-current switch likewise connected across the electrolyte gap and preferably constituted by thyristors. In this manner, the electric energy previously stored in the smoothing reactor and in the transformer of the current supply equipment is made harmless, as well as any energy that may be residually supplied until the primary side of the energizing circuit is completely blocked.

It is an object of our invention to further improve electrolytic metal-forming systems generally of the type just described.

More specifically, it is an object to improve the mounting of the switching thyristors so as to avoid adding to the system any switch leads apt to increase the inductivity of the circuit to be interrupted under control by the voltage sensing means in the event of excessive overload or short-circuit currents.

Another object of the invention is to considerably simplify the structural means for mounting the thyristors or the like power breaking devices into the control system and to also improve the dissipation of waste heat from these devices, thus increasing their current-carrying capacity or minimizing, if not eliminating, the need for additional cooling.

We have discovered that these and further objects and advantages are achieved in a simple and advantageous manner by accommodating the power-switching thyristors at a singular location of the device for limiting the short-circuit current in electrolytic metal-forming apparatus, namely by mounting the thyristors, preferably in the form of disc cells, between the bus bars which supply rectified power current to the anode (workpiece or workpiece holder) and cathode (forming tool) respectively of the electrolytic forming apparatus.

It will be recognized that this does away with any additional switch leads that may increase the inductivity of the power circuit to be interrupted. A particularly simple fastening of the disc-type thyristors results if the disc cells are clamped directly between the bus bars or portions thereof that extend parallel to each other. The disc cells may be mounted either at the input end or at the output end of the buses. Mounting them at the output end affords the advantage of further decreasing the inductivity of the circuit to be interrupted. If the current buses are cooled, such as by air cooling or water cooling, additional cooling means for the thyristor cells may be largely dispensed with, since the waste heat of the thyristors is dissipated substantially by the bus bars on account of the direct contact between buses and thyristors.

Preferably care is taken to further reduce the short-circuit energy that may become discharged through the workpiece and the tool and to accelerate the oscillatory decay of the short-circuit current. For that reason, the portion of the current buses extending between the thyristor cells and the cathode-anode localities is given low inductivity and relatively high ohmic resistance so that the time constant of this bus portion is approximately equal to, or smaller than, the cycle duration of the utility line frequency from which the circuits of the metal-forming apparatus are energized.

The above-mentioned and further objects, advantages and features of our invention, said features being set forth with particularity in the claims annexed hereto, will be apparent from the following description in conjunction with the accompanying drawings illustrating by way of example an embodiment of an electrolytic metal-forming apparatus with a current limiting device according to the invention.

Figure 1:
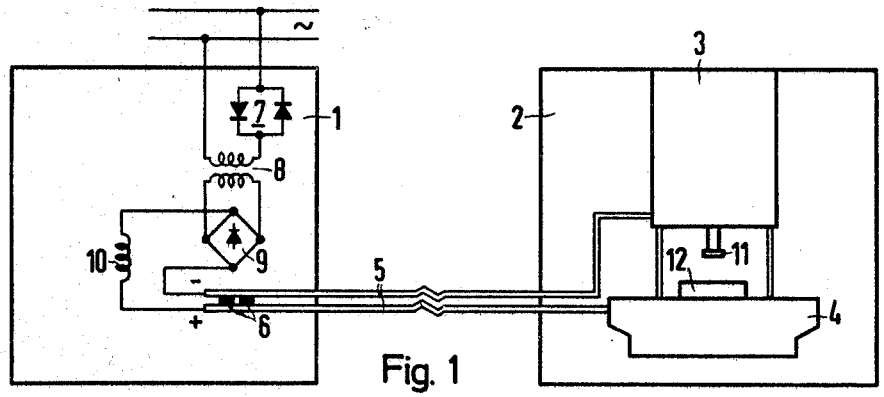
FIG. 1 is a schematic illustration of the entire system.

The metal-forming plant shown in FIG. 1 comprises a current supply portion 1 and an electrolytic metal-forming machine 2 which is connected with the supply portion 1 by parallel current bus bars 5 closely adjacent to each other.

Figure 3:
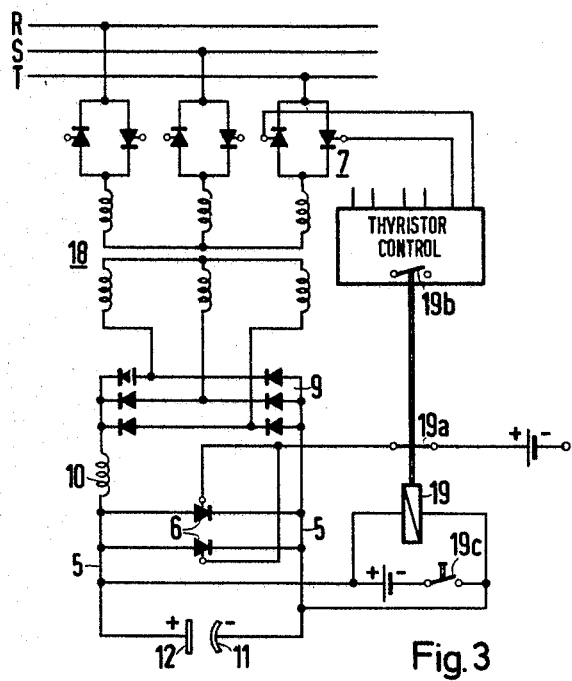
FIG. 3 exemplifies in detail a schematic circuit diagram of such a system.

The current supply portion 1 which, for simplicity, is shown as a single-phase circuit bit in realty is constituted by a multi-phase circuit as exemplified in FIG. 3, comprises a current control member composed of antiparallel thyristors 7 which connect the alternating-current utility line (50 or 60 Hz.) with the primary winding is connected through a rectifier bridge network 9 and in series with a smoothing reactor 10 to the current buses 5, the latter being thus supplied with direct current. The bus 5 carrying the negative potential (—) is fastened to the tool 11 accommodated in the head 3 of the electrolytic forming machine 2. The bus carrying the positive potential (+) is connected to the table 4 upon which the workpiece 12 is conductively mounted to act as the anode. Suitable operating data, for example, are an electrode voltage of 14 volt, a current of 10⁴ amps, and an electrode gap spacing of 0.1 mm.

Connected in parallel relation to the two electrodes is a voltage sensing member which is not shown in FIG. 1 but will be described with reference to FIG. 3. The sensing member responds at a slight change in voltage, compared with the rated operating voltage, as may occur in consequence of a short circuit between tool and workpiece. The sensing member then controls the thyristors 7 to close and also closes power circuit switches 6, such a thyristors which likewise are connected parallel to the electrodes.

As a result, the magnetic energy stored in the smoothing reactor 10 and in the transformer 8 becomes harmless as well as the residual energy supplied up to the moment the primary side of the system is completely blocked.

The thyristors 6 are designed as flat cells, in which shape they are available in the trade. They are directly clamped between the two current supply buses 5 within the current supply portion 1 of the system. This permits a particularly simple mounting and fastening of the thyristors and does away with the need for additional leads. Furthermore, if the bus bars are cooled, they also provide suitable cooling for the thyristors. By virtue of their parallel mounting in proximity to each other, the buses 5 themselves have a relatively slight inductivity L, the main share of inductivity being constituted only by the loop at the anode and cathode of the electrolytic forming machine. However, the buses have a relatively high ohmic resistance R, so that the circuit to be switched off has a time constant T approximately equal to or smaller than the cycle duration of the line frequency (50 or 60 Hz.) This inductivity for example is $L = 10^{-6} H \cdot R = 10^{-4}$ ohm.

The above-described mounting of the thyristor disc cells between the parallel buses thus minimizes the magnetic energy stored in the buses and residually discharging through tool and workpiece, and also has the advantage of providing for a very short-lasting oscillation decay of the short-circuit current.

Figure 2:
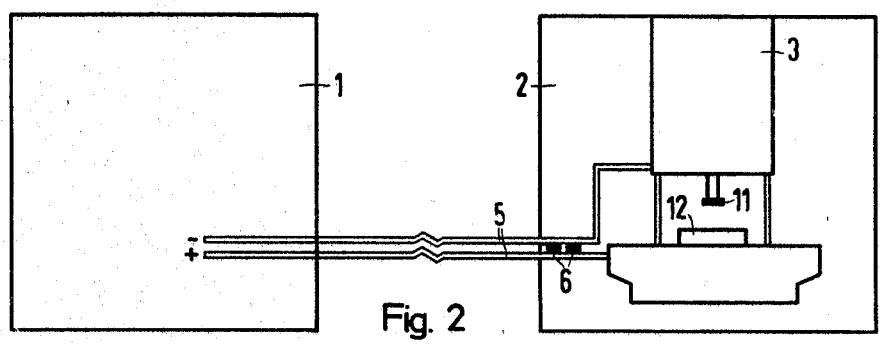
FIG. 2 shows in simplified form a modification of the system according to FIG. 1.

In FIG. 2, showing substantially the same system as FIG. 1 and denoting its components by the same reference numerals respectively, the thyristors 6 are also mounted between the current buses 5 but are located within the confines of the metal-forming machine or in the immediate vicinity thereof. Thus further reduces the inductivity of any short-circuit path through anode and cathode.

While in the foregoing as well as hereinafter reference is made to power switches in the form of thyristors, it will be understood that they may be substituted within the scope and contemplation of our invention by analogously operating solid-state switching devices, such as galvanomagnetic resistors and the like.

A description of circuit details relating to the system of FIG. 1 and FIG. 2 will now be given with reference to FIG. 3 in which the same reference numerals are applied as in FIG. 1 to respectively analogous components.

Power is supplied to the system through a three-phase transformer 18 whose primary winding is connected through three pairs of antiparallel thyristors 7 with a three-phase line RST. The thyristors jointly form an alternating-current controller. Connected to the secondary winding of transformer 18 is a bridge network 9 of rectifier diodes whose direct-voltage output terminals are connected through a smoothing reactor 10 to the positive bus 5 attached to the workpiece 12 and to the negative bus 5 leading to the tool 11. Thus, the workpiece 12 constitutes the anode and the tool 11 the cathode of an electrolyte gap which is submerged in a suitable vessel and constantly traversed by a flow of circulating electrolyte, such as an aqueous solution of NaCl.

A voltage-responsive sensing member constituted by a voltage relay 19 is connected parallel to the gap between the workpiece 12 and the tool 11. The relay 19 responds when the electrode voltage drops to a given value slightly below the normal operating electrode voltage. The above-mentioned thyristors 6, conjointly rated for the power current that may occur under short-circuit conditions are mounted between the positive and negative buses and thus are electrically connected in parallel to the electrolyte gap between the two electrodes. The thyristors 6 are normally open and are fired to close under control by a contact 19a of relay 19.

The voltage relay 19 is essentially a sensitive measureing relay which is energized and attracts its armature at the normal operating voltage of 12 volt. The relay contact 19a is normally open, the relay contact 19b normally closed. When the operating voltage drops on account of a short circuit, the relay 19 will drop off, for example at 11.5 volt (or if desired at 11 volt, for example). This closes the relay contact 19a which connects the gate circuits of thyristors 7 to a positive firing voltage. The thyristors 7 therefore, are turned on. Simultaneously, the contact 19b opens and interrupts the firing circuit of the thyristors 7 in the alternating-current controller. Details of the thyristor control circuit thus actuated by the contact 19b are not illustrated because they are well known in a variety of configurations (for example, SCR-Manual of General Electric Co., second Edition, 1961, FIG 8.2). It will be understood that while only one contact 19b is illustrated, corresponding contacts may be provided for the gate circuits of the other thyristors. It should further be understood that while for simplicity, a mechanical control of the thyristors by relay contacts is shown, the thyristor switching operation may be controlled by means of circuits composed entirely of electronic or solid-state components, this being likewise known as such and not essential to the present invention proper.

To permit the system to be set into operation, a manually operable key 19c permits applying voltage to the relay 19 during the start-up stage in which the normal operating voltage between the electrodes is not yet established.

In the event of short-circuit conditions, the sensitive relay 19 operates to have the short-circuit current pass through the power switches (thyristors) 6 and then also opens the power supply circuit in switches (thyristors) 7. The thyristors 6 thus consume the considerable amount of magnetic energy stored in the smoothing reactor 10, as well as any residual amount of energy still furnished from the power line RST up to the complete extinction in the thyristors 7. As a result, workpiece and tool are protected from damage.

To those skilled in the art it will be obvious upon a study of this disclosure that our invention permits of various modifications with respect to circuitry and the particular type of solid-state switching components here, for convenience, designated by the term "thyristor." Hence, our invention may be given embodiments other than those particularly illustrated and described herein, without departing from the essential features of our invention and within the scope of the claims annexed hereto.

We claim:

1. With electrolytic metal-shaping apparatus having connection means for anodically connecting a workpiece, a cathodic tool for acting through electrolyte upon the workpiece, alternating-current supply means, a rectifier, alternating-current control means connecting said rectifier to said supply means, a smoothing reactor, and direct-current bus bars connecting said tool and said connection means to said rectifier in series with said reactor, the combination of a device for limiting short-circuit currents comprising a voltage sensing member responsive to a given departure from the normal electrode operating voltage and connected to said control means for blocking said control means to discontinue the supply of alternating current upon response of said sensing member, normally open power-current switching means controlled by said sensing member to close in dependence upon response of said sensing member, said switching means being constituted by solid-state semiconductor switch cells and being inserted between said bus bars and thereby mechanically mounted and electrically parallel connected to the gap between tool and workpiece.

2. In apparatus according to claim 1, said direct-current bus bars having respective portions extending parallel and in proximity to each other, and said cells being thyristors and clamped between said parallel bus portions.

3. In apparatus according to claim 2, said cells being inserted near one of the ends of said bus bars.

4. In apparatus according to claim 2, said thyristor being in thermal contact with said bus bars so that said bars form a heat sink for said cells.

5. In apparatus according to claim 1, the portion of said bus bars extending from said cells to the workpiece tool having a time constant up to a value approximately equal to the cycle duration of the alternating-current frequency of said supply means.

6. With electrolytic metal-shaping apparatus having connection means for anodically connecting a workpiece, a cathodic tool for acting through electrolyte upon the workpiece and two direct-current bus bars connected with said tool and said connection means respectively, in combination a device for limiting short-circuits between tool and workpiece comprising at least one solid-state semiconductor switch cell having switch-closing control means for response to an anode-to-cathode shorting condition, said bus bars having respective portions extending parallel and in proximity to each other, and said switch cell, when operatively mounted, being inserted between and in contact with said respective bus portions.

References Cited

UNITED STATES PATENTS

| | | | |
|---|---|---|---|
| 3,117,919 | 1/1964 | Mittelmann | 204—224 XR |
| 3,202,599 | 8/1965 | Schierholt | 204—224 |
| 3,328,279 | 6/1967 | Williams et al. | 204—224 |
| 3,433,728 | 3/1969 | Petroff | 204—224 |

JOHN H. MACK, Primary Examiner

D. R. VALENTINE, Assistant Examiner

U.S. Cl. X.R.

204—228